United States Patent
Tsai et al.

(10) Patent No.: US 10,726,247 B2
(45) Date of Patent: Jul. 28, 2020

(54) SYSTEM AND METHOD FOR MONITORING QUALITIES OF TEACHING AND LEARNING

(71) Applicant: Institute For Information Industry, Taipei (TW)

(72) Inventors: I-Chang Tsai, Taipei (TW); Chao-Hung Liao, Taipei (TW); Chung-Han Yeh, New Taipei (TW); Han-Yen Yu, Taipei (TW); Yu-Te Ku, New Taipei (TW)

(73) Assignee: Institute For Information Industry, Taipei (TW)

( * ) Notice: Subject to any disclaimer, the term of this patent is extended or adjusted under 35 U.S.C. 154(b) by 111 days.

(21) Appl. No.: 16/120,097

(22) Filed: Aug. 31, 2018

(65) Prior Publication Data
US 2020/0034607 A1   Jan. 30, 2020

(30) Foreign Application Priority Data
Jul. 27, 2018   (TW) .............................. 107126148 A

(51) Int. Cl.
*G06K 9/00* (2006.01)
*G10L 15/26* (2006.01)
(Continued)

(52) U.S. Cl.
CPC ..... *G06K 9/00302* (2013.01); *G06K 9/00281* (2013.01); *G06K 9/00335* (2013.01);
(Continued)

(58) Field of Classification Search
CPC ...... G06K 9/00302–00389; G06Q 50/20–205; G10L 15/08–265
See application file for complete search history.

(56) References Cited

U.S. PATENT DOCUMENTS

| | | | | |
|---|---|---|---|---|
| 2011/0263946 | A1* | 10/2011 | el Kaliouby | A61B 5/1128 600/300 |
| 2014/0154659 | A1* | 6/2014 | Otwell | G09B 5/02 434/365 |
| 2014/0205984 | A1* | 7/2014 | Chapman | G09B 5/00 434/308 |

FOREIGN PATENT DOCUMENTS

| | | |
|---|---|---|
| CN | 206489625 U | 9/2017 |
| CN | 107832740 A | 3/2018 |

(Continued)

OTHER PUBLICATIONS

Office Action to the corresponding Taiwan Patent Application rendered by the Taiwan Intellectual Property Office (TIPO) dated Jun. 19, 2019, 23 pages (including English translation).

*Primary Examiner* — Casey L Kretzer
(74) *Attorney, Agent, or Firm* — Skaar Ulbrich Macari, P.A.

(57) ABSTRACT

A system and method for monitoring qualities of teaching and learning are provided. The system includes at least one receiving interface, a processor, and an output apparatus, wherein the processor is electrically connected to the at least one receiving interface and the output apparatus. The at least one receiving interface receives at least one digital image. The processor identifies at least one facial message from the at least one digital image, identifies at least one body message from the at least one digital image, and determines at least one teaching and learning quality index according to the at least one facial message and the at least one body message. The output apparatus outputs the at least one facial message, the at least one body message, and the at least one teaching and learning quality index.

18 Claims, 7 Drawing Sheets

(51) Int. Cl.
*G06Q 50/20* (2012.01)
*G09B 5/02* (2006.01)

(52) U.S. Cl.
CPC ............ *G06Q 50/205* (2013.01); *G09B 5/02* (2013.01); *G10L 15/26* (2013.01)

(56) References Cited

FOREIGN PATENT DOCUMENTS

| | | |
|---|---|---|
| CN | 108108903 A | 6/2018 |
| CN | 108281052 A | 7/2018 |
| JP | 2015-125553 A | 7/2015 |
| TW | M562459 | 6/2018 |

\* cited by examiner

SYSTEM AND METHOD FOR MONITORING QUALITIES OF TEACHING AND LEARNING

PRIORITY

This application claims priority to Taiwan Patent Application No. 107126148 filed on Jul. 27, 2018, which is hereby incorporated by reference in its entirety.

FIELD

The present invention relates to a system and a method for monitoring qualities of teaching and learning. More particularly, the present invention relates to a system and a method for monitoring qualities of teaching and learning which determine qualities of teaching and learning by using image information and voice information.

BACKGROUND

With the advancement of network technology and the coming of digital age, various network-based teaching models have emerged, such as live broadcast teaching and online teaching. Live broadcast teaching is also known as distance teaching, which instantly transmits the video and audio of a class to screens in classrooms or computers of students by holding a web conference. In this way, teachers and students can be in the same class without being at the same place. As for online teaching, all teaching materials are uploaded to a system platform so that students can select suitable material(s) to watch or listen after logging in the system platform.

Some of the conventional live broadcast teaching techniques have been able to return the images of the classroom or the students for teachers' reference. Usually, the returned images are from several places and contain several students' image. It is difficult for a teacher to interpret the returned images in a short time and, therefore, it is impossible for a teacher to timely (or even immediately) grasp the learning status of the students. In addition, most of the conventional online teaching platforms are unidirectional and, therefore, a teacher is unable to timely (or even immediately) learn the learning status of the students (for example, the learning outcomes, the gaze concentration, or even accurately watching). Most of the conventional online teaching platforms determine the learning outcomes of the students by giving post-class tests or questionnaires and, thus, it is impossible for teachers to timely (or even immediately) adjust the content of courses or the way of teaching courses.

To solve the aforesaid problems, there is a need for a technology that can timely (or even immediately) analyze and monitor the learning status of students so that teachers can timely (or even immediately) grasp the learning status of each of the students.

SUMMARY

To solve the aforesaid problems, a system and a method for monitoring qualities of teaching and learning is included in this application.

The system for monitoring qualities of teaching and learning, according to certain embodiments, comprises at least one receiving interface, a processor, and an output apparatus, wherein the processor is electrically connected to the at least one receiving interface and the output apparatus. The at least one receiving interface is configured to receive at least one digital image. The processor is configured to identify at least one facial message from each of the at least one digital image, identify at least one body message from each of the at least one digital image, and determine at least one teaching and learning quality index according to the at least one facial message and the at least one body message. The output apparatus is configured to output the at least one facial message, the at least one body message, and the at least one teaching and learning quality index.

In some embodiments of the system for monitoring qualities of teaching and learning, the at least one receiving interface is further configured to receive at least one voice signal, the processor is further configured to convert the at least one voice signal to a plurality of text strings, and the processor is further configured to determine at least one teaching and learning progress by comparing the plurality of text strings with a course chapter database.

The method for monitoring qualities of teaching and learning is suitable for an electronic computing apparatus and comprises the following steps: (a) receiving at least one digital image; (b) identifying at least one facial message from each of the at least one digital image; (c) identifying at least one body message from each of the at least one digital image; and (d) determining at least one teaching and learning quality index according to the at least one facial message and the at least one body message.

In some embodiments, the method for monitoring qualities of teaching and learning further comprises the following steps: (e) receiving at least one voice signal; (f) converting the at least one voice signal to a plurality of text strings; and (g) determining at least one teaching and learning progress by comparing the plurality of text strings with a course chapter database.

The system and method for monitoring qualities of teaching and learning may be implemented as a plugin application and may be synchronized with the teaching courses to monitor and analyze the learning status of the students. The effects achieved by the present invention include: (i) identifying and analyzing the performance of the students in class based on digital image analysis to grasp the atmosphere of the learning field; (ii) analyzing the concentration of the students in the classroom to learn whether the students can grasp the key points of knowledge; (iii) the result of the analysis allows the teachers to timely adjust the teaching rhythm to avoid depressed learning atmosphere resulting in a significant reduction in learning outcomes; and (iv) assisting the teachers to learn the learning status from the digital images returned from the several classrooms to grasp the learning atmosphere of each classroom.

The detailed technologies and embodiments of the present invention are described in the following description in conjunction with the drawings, and the technical features of the claimed invention can be understood by a person having ordinary skill in the art.

DETAILED DESCRIPTION

In the following description, explanation for the system and the method for monitoring qualities of teaching and learning will be provided for certain example embodiments. However, these example embodiments are not intended to limit the present invention to any specific examples, environments, embodiments, applications, or specific process flows or steps described in these example embodiments. Therefore, the description for the example embodiments does not limit the scope of the present invention. The scope of the present invention should be determined according to the claims.

It shall be appreciated that, in the attached drawings, elements unrelated to the present invention are omitted from depiction. Besides, the dimensions of individual elements and dimensional relationships among the individual elements in the attached drawings are illustrated only as exemplary examples, but not to limit the present invention.

Figure 1A:
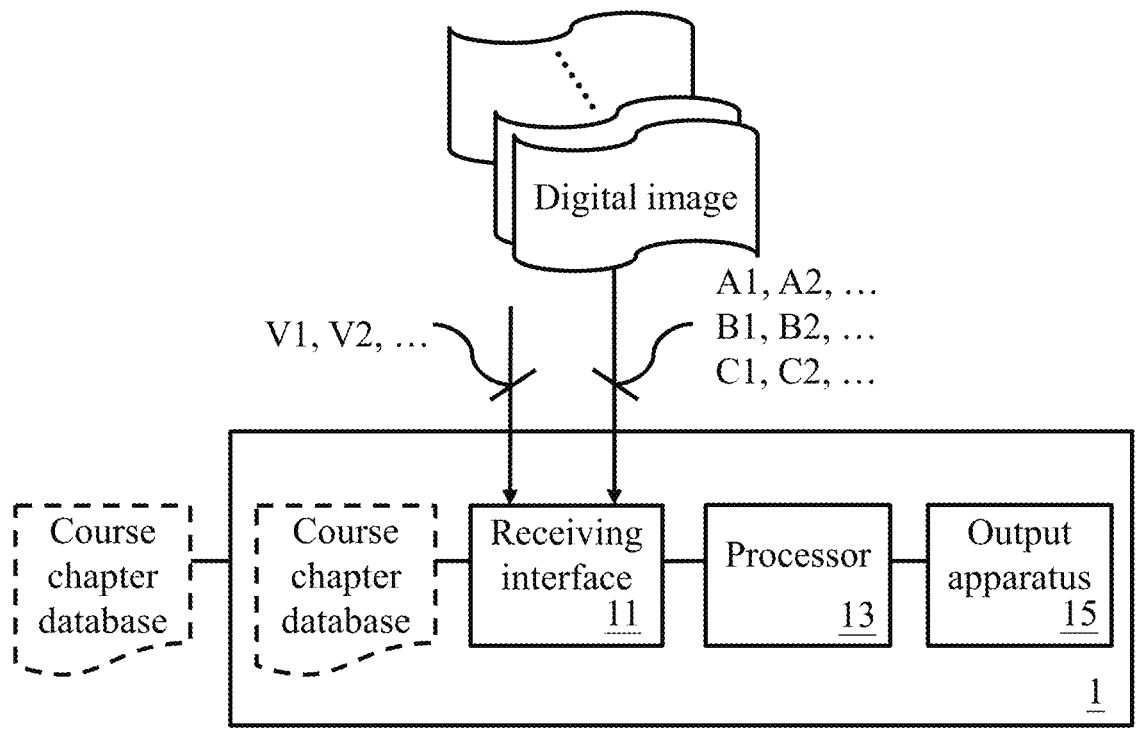
FIG. 1A is a schematic diagram illustrating an architecture of a system for monitoring qualities of teaching and learning of the first embodiment and the second embodiment of the present invention.

The first embodiment is a system for monitoring qualities of teaching and learning 1, and the architecture of it is illustrated in FIG. 1A. The system for monitoring qualities of teaching and learning 1 comprises a receiving interface 11, a processor 13, and an output apparatus 15, wherein the processor 13 is electrically connected to the receiving interface 11 and the output apparatus 15. The receiving interface 11 may be one of various kinds of wired or wireless interface capable of receiving digital data. The processor 13 may be any one of various kinds of processors, central processing units (CPUs), microprocessors, or other computing apparatuses known by a person having ordinary skill in the art of the present invention. The output apparatus 15 may be any apparatus capable of outputting data, such as a display apparatus.

Figure 1B:
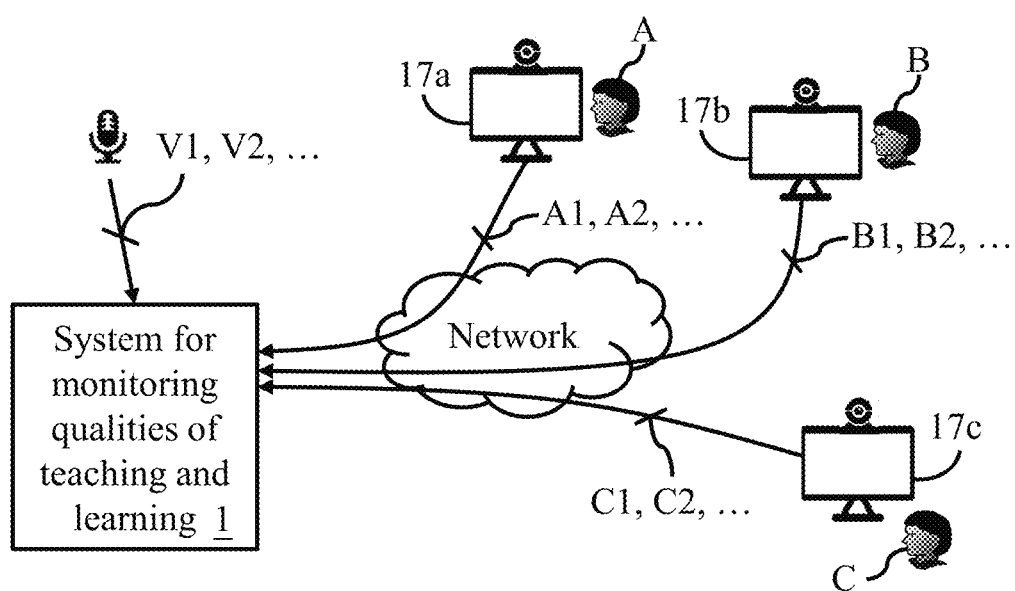
FIG. 1B is a schematic diagram illustrating the application context of the first embodiment of the present invention.

In this embodiment, when a teacher provides a course through the network (for example, live broadcasting), the system for monitoring qualities of teaching and learning 1 will be connected with the terminal apparatuses of the students who join the course to timely (or even immediate) monitor the learning status of the students and provide the learning status to the teacher for reference. For the convenience of the following description, it is assumed that three students A, B, and C join the teaching course and are connected to the system for monitoring qualities of teaching and learning 1 through the terminal apparatuses 17a, 17b, and 17c respectively as shown in FIG. 1B. It should be explained that the present invention does not limit the number of the terminal apparatuses connected to the system for monitoring qualities of teaching and learning 1 (that is, there is no limitation of the number of students who join the teaching course), nor does it limit the type of each terminal apparatus (for example, desktop computer, notebook computer, mobile apparatus). In addition, it should be explained that the present invention does not limit which apparatus the teacher provides the teaching course through (for example, the course may be provided through the system for monitoring qualities of teaching and learning 1, or may be provided through other apparatuses), and how the teaching course provided to the terminal apparatuses 17a, 17b, 17c are not the main point of the present invention. Hence, the details are not given herein.

In the embodiment, the system for monitoring qualities of teaching and learning 1 will continuously receive digital images when the teaching course is being conducting. Specifically, the receiving interface 11 receives the digital images A1, A2 . . . from the terminal apparatus 17a, receives the digital images B1, B2 . . . from the terminal apparatus 17b, and receives the digital images C1, C2 . . . from the terminal apparatus 17c. The processor 13 identifies a facial message and a body message from each of the digital images A1, A2, B1, B2, C1, C2 . . . and determines at least one teaching and learning quality index according to the facial messages and the body messages. For example, different facial messages correspond to different scores, different body messages correspond to different scores, the processor 13 determines at least one teaching and learning quality index according to the score corresponding to the identified facial message and the score corresponding to the identified body message. The output apparatus 15 outputs the facial messages, the body messages, and the at least one teaching and learning quality index.

In some embodiments, the processor 13 identifies a facial message from each of the digital images A1, A2, B1, B2, C1, C2, . . . by performing the following operations: (a1) capturing a plurality of facial feature points from each of the digital images A1, A2, B1, B2, C1, C2, . . . and (a2) determining a facial expression for the plurality of facial feature points corresponding to each of the digital images A1, A2, B1, B2, C1, C2, . . . by a facial concentration classifier. It shall be explained that the aforesaid facial concentration classifier may be a deep learning classifier. In these embodiments, the facial message of each of the digital images comprises the facial expression, the processor 13 further determines at least one course satisfaction value according to the facial expression, wherein the at least one teaching and learning quality index comprises the at least one course satisfaction value.

In some embodiments, the processor 13 identifies a body message from each of the digital images A1, A2, B1, B2, C1, C2, . . . by performing the following operations: (b1) capturing a plurality of body feature points from each of the digital images A1, A2, B1, B2, C1, C2, . . . and (b2) determining a body posture for the plurality of body feature points corresponding to each of the digital images A1, A2, B1, B2, C1, C2, . . . by a body movement classifier. It shall be explained that the aforesaid body movement classifier may be a deep learning classifier. In these embodiments, the body message of each of the digital images comprises the body posture, the processor 13 further determines at least one student interaction level according to the body postures, wherein the at least one teaching and learning quality index comprises the at least one student interaction level.

In some embodiments, the processor 13 identifies a facial message from each of the digital images A1, A2, B1, B2, C1, C2, . . . by performing the following operations: (a1) capturing a plurality of facial feature points from each of the digital images A1, A2, B1, B2, C1, C2, . . . and (a3) determining an expression identifying concentration value for the facial feature points corresponding to each of the at least one digital images A1, A2, B1, B2, C1, C2, . . . by a facial concentration classifier. It shall be explained that the aforesaid facial concentration classifier may be a deep learning classifier. In addition, the processor 13 identifies a body message from each of the digital images A1, A2, B1, B2, C1, C2, . . . , by performing the following operations: (b1) capturing a plurality of body feature points from each of the digital images A1, A2, B1, B2, C1, C2, . . . and (b3) determining a head posture for the body feature points corresponding to each of the at least one digital images A1, A2, B1, B2, C1, C2, . . . , by a body movement classifier. It shall be explained that the aforesaid body movement classifier may be a deep learning classifier. In these embodiments, the facial message of each of the digital images comprises the expression identifying concentration value, the body message of each of the digital images comprises the head posture, the processor 13 further determines at least one student hard work level value according to the expression identifying concentration values and the head postures, wherein the at least one teaching and learning quality index comprises the at least one student hard work level value.

In some embodiments, the processor 13 identifies a facial message from each of the digital images A1, A2, B1, B2, C1, C2, . . . by performing the aforesaid operations (a1), (a2), and (a3), wherein the facial message of each of the digital images comprises the facial expression and the expression identifying concentration value. In addition, the processor 13 identifies a body message from each of the digital images A1, A2, B1, B2, C1, C2, . . . by performing the aforesaid operations (b1), (b2), and (b3), wherein the body message of each of the digital images comprises the body posture and the head posture. In these embodiments, the processor 13 further determines at least one course satisfaction value according to the facial expressions, determines at least one student interaction level according to the body postures, and determines at least one student hard work level value according to the expression identifying concentration values and the head postures. The at least one teaching and learning quality index comprises the at least one course satisfaction value, the at least one student interaction level, and the at least one student hard work level value.

In some embodiments, the processor may record the correspondence between the students, the digital images, the facial messages, and the body messages. Specifically, since the digital images A1, A2 are from the terminal apparatus 17a of the student A, the processor 13 assigns the facial message and the body message identified from the digital images A1, A2 to correspond to the student A. Similarly, the processor 13 assigns the facial message and the body message identified from the digital images B1, B2 to correspond to the student B and assigns the facial message and the body message identified from the digital images C1, C2 to correspond to the student C. In these embodiments, processor 13 may calculate the teaching and learning quality index corresponding to each of the students according to the facial message and the body message corresponding to each of the students.

In some embodiments, each of the digital images received by the receiving interface 11 corresponds to a time point. A time point to which a digital image corresponds is the time point (within an allowable error range) when the digital image is captured by a terminal apparatus. Therefore, if the digital image comprises an image of a student, the terminal apparatus captures the student's facial status and the body status at the time point. In addition, since a digital image corresponds to a time point, the facial message and the body message identified from the digital image also correspond to the time point to which the digital image corresponds. It shall be explained that due to various kinds of factors (for example, the Internet connection status, the time when the students join the teaching course), different time points may correspond to different numbers of digital images.

Figure 1C:
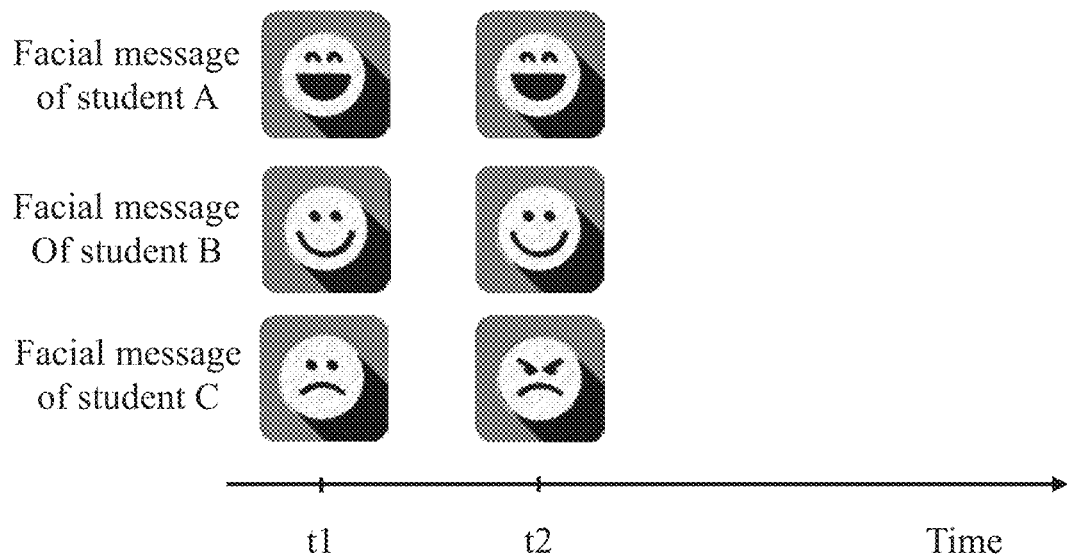
FIG. 1C illustrates a specific example of the plurality of facial messages received from the digital images.
Figure 1D:
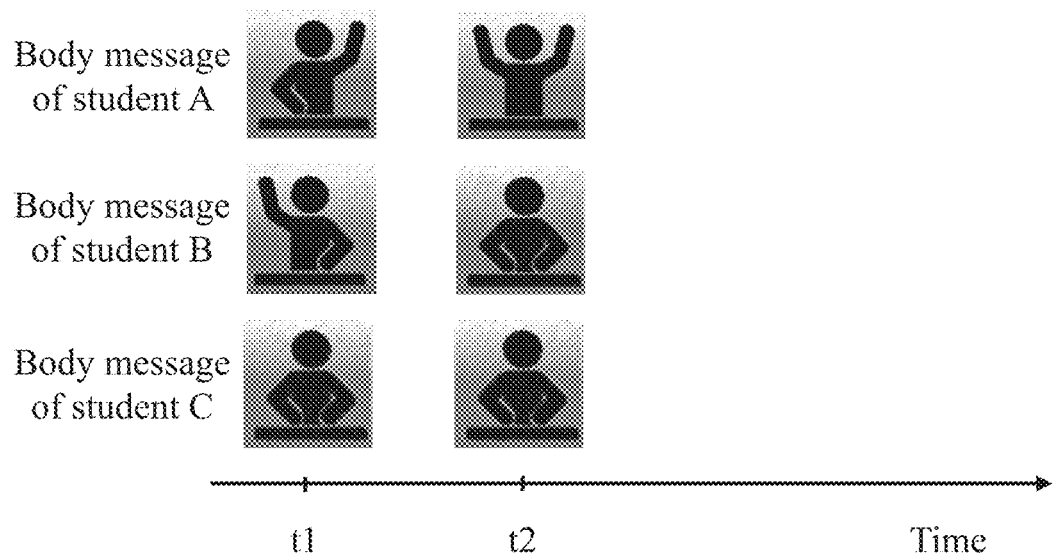
FIG. 1D illustrates a specific example of the plurality of body messages received from the digital images.

For ease of understanding, it is assumed that the digital images A1, B1, and C1 correspond to a time point t1 and the digital images A2, B2, and C2 correspond to a time point t2. The facial messages derived based on the digital images A1, B1, and C1 correspond to the time point t1 and the facial messages derived based on the digital images A2, B2, and C2 correspond to the time point t2 as shown in FIG. 1C (taking the facial message being the facial expression as an example). Similarly, the body messages derived based on the digital images A1, B1, and C1 correspond to the time point t1 and the body messages derived based on the digital images A2, B2, and C2 correspond to the time point t2 as shown in FIG. 1D (taking the body message being the body posture as an example).

In those embodiments, each of the at least one teaching and learning quality index determined by the processor 13 corresponds to one of the time points. Specifically, the processor 13 may calculate a teaching and learning quality index for each of the time points. Specifically, the processor 13 may calculate a teaching and learning quality index for the time point t1 according to the facial messages and the body messages corresponding to the time point t1 and calculate a teaching and learning quality index for the time point t2 according to the facial messages and the body messages corresponding to the time point t2.

In some embodiments, the system for monitoring qualities of teaching and learning 1 may receive at least one voice signal (which is produced when the teacher provides the teaching course) by the receiving interface 11 or another receiving interface (not shown in the figures). In these embodiments, the processor 13 may further convert each of the voice signals to a plurality of text strings and determine at least one teaching and learning progress (for example, a chapter of a textbook, a page of a textbook) by comparing the plurality of text strings with a course chapter database (not shown in the figures).

In some embodiments, each of the voice signals corresponds to a time point, so the teaching and learning progress determined based on the voice signal also corresponds to the time point. For ease of understanding, it is assumed that the receiving interface 11 receives the voice signals V1, V2, etc. If the voice signal V1 corresponds to the time point t1, the teaching and learning progress based on the voice signal V1 also corresponds to the time point t1. If the voice signal V2 corresponds to the time point t2, the teaching and learning progress based on the voice signal V2 also corresponds to the time point t2.

In some embodiments, the system for monitoring qualities of teaching and learning 1 further establishes the correspondence between the teaching and learning quality index and the teaching and learning progress. Specifically, the processor 13 establishes the correspondence between the teaching and learning quality index and the teaching and learning progress by comparing the time point to which the digital image corresponds (it may be understood as the time point to which the face messages, the body messages, and the teaching and learning quality index correspond) with the time point to which the voice signal corresponds (it may be understood as the time point to which the teaching and learning progress corresponds). Specifically, since the digital images A1, B1, C1 and the voice signal V1 all correspond to the time point t1, the processor 13 assigns the teaching and learning quality index determined based on the digital images A1, B1, C1 to correspond to the teaching and learning progress determined based on the voice signal V1. Similarly, since the digital images A2, B2, C2 and the voice signal V2 all correspond to the time point t2, the processor 13 assigns the teaching and learning quality index determined based on the digital images A2, B2, C2 to correspond to the teaching and learning progress determined based on the voice signal V2.

In some embodiments, the system for monitoring qualities of teaching and learning 1 preforms the aforesaid operations in real time. Specifically, after the receiving interface 11 receives the digital images A1, B1, C1 corresponding to the time point t1, the system for monitoring qualities of teaching and learning 1 immediately analyzes the digital images A1, B1, C1 to obtain the plurality of facial messages and the plurality of body messages corresponding to the time point t1, and then calculates the teaching and learning quality index for the time point t1. The output apparatus 15 may also immediately output the facial messages, the body messages, and the teaching and learning quality index of the time point t1 so that the teacher may immediately adjust the content of courses or the way of teaching courses according to the status of the students. Similarly, for the subsequent time points, the system for monitoring qualities of teaching and learning 1 also preforms the aforesaid operations immediately and output the facial messages, body messages, and teaching and learning quality index to the teacher in real time for reference.

In summary, when a teacher provides a course through the network (for example, live broadcasting), the system for monitoring qualities of teaching and learning 1 can timely (ore even immediately) identify the students' facial messages and body messages from the digital images of the students, determine the teaching and learning quality index accordingly, and provide these information to the teacher for reference. Therefore, the teacher can timely (or even immediately) grasp the learning status of each of the students and timely adjust the content of courses and/or the way of teaching courses and then significantly improve the quality of online teaching and learning. In addition, the system for monitoring qualities of teaching and learning 1 may determine the teaching and learning progress according to the voice signal of the teacher when giving the teaching course, and then establishes the correspondence between the teaching and learning quality index and the teaching and learning progress. In this way, the teacher can grasp the learning status of the students for different teaching and learning progress and can further assess whether the teaching content has to be improved.

Figures 2A, 2B:
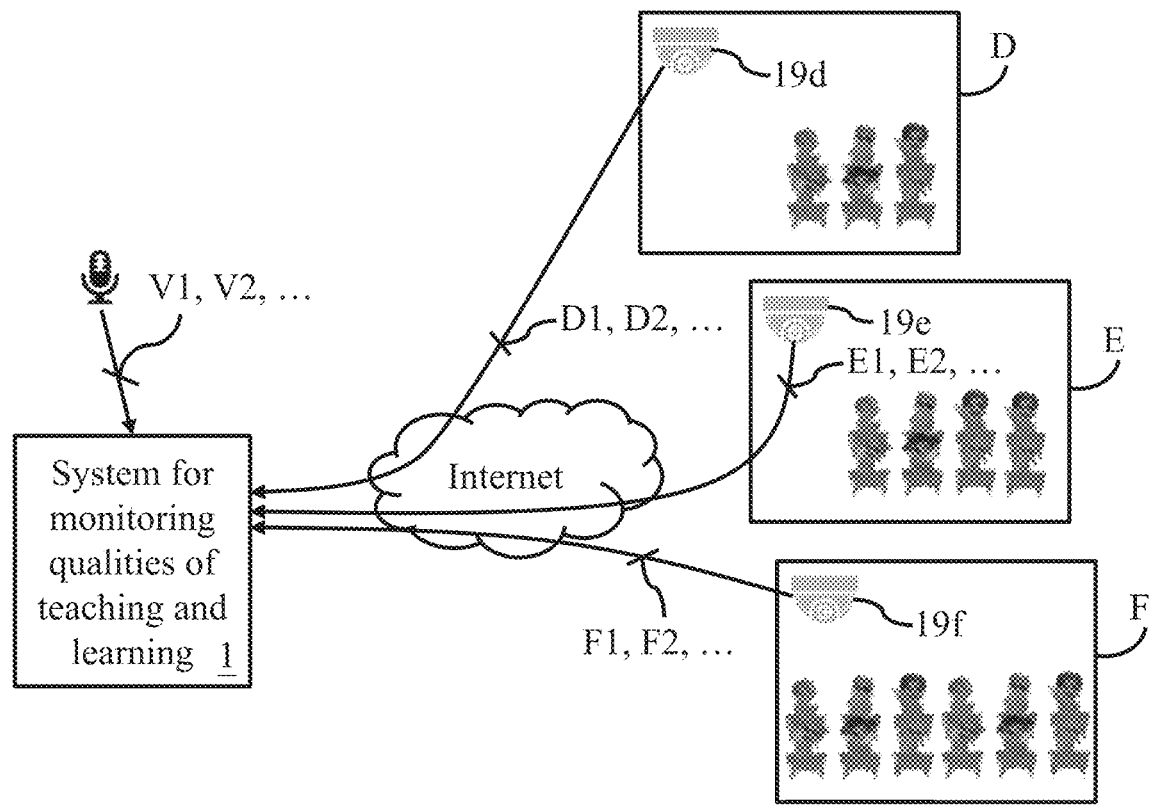
FIG. 2A is a schematic diagram illustrating the application context of the second embodiment of the present invention.
FIG. 2B illustrates a specific example of the seating table of the students.

Regarding the second embodiment of the present invention, please refer to FIG. 1A, FIG. 2A and FIG. 2B. The main difference between the second embodiment and the first embodiment lies in the content of the digital images and the related operations thereof, and the following description will focus on the difference between the two embodiments.

In this embodiment, when a teacher provides a course through the network (for example, live broadcasting), the system for monitoring qualities of teaching and learning 1 will connect to the monitoring camera installed in the classroom to timely (or even immediately) monitor the learning status of the students in the classroom and provide these information to the teacher for reference. For the convenience of the following description, it is assumed that three monitoring cameras 19d, 19e, 19f of the three classrooms D, E, F are connected to the system for monitoring qualities of teaching and learning 1 as shown in FIG. 2A. It should be explained that the present invention does not limit the number of the monitoring cameras connected to the system for monitoring qualities of teaching and learning 1, nor does it limit the type of each monitoring camera.

In this embodiment, since the monitoring cameras 19d, 19e, 19f are installed in the classroom, the digital images transmitted by them will comprise images of a plurality of users (i.e., a plurality of students) basically. In this embodiment, the receiving interface 11 receives the digital images D1, D2 . . . from the monitoring camera 19d, receives the digital images E1, E2 . . . from the monitoring camera 19e, and receives the digital images F1, F2 . . . from the monitoring camera 19f. The processor 13 confirms a plurality of users from each of the digital images D1, D2, E1, E2, F1, F2 . . . , identifies a plurality of facial messages from each of the digital images D1, D2, E1, E2, F1, F2 . . . , and identifies a plurality of body messages from each of the digital images D1, D2, E1, E2, F1, F2, wherein each of the facial messages corresponds to one of the confirmed users, and each of the body messages corresponds to one of the confirmed users. The processor 13 determines at least one teaching and learning quality index according to the facial messages and the body messages, and each of the at least one teaching and learning quality index corresponds to one of the confirmed users.

In some embodiments, the processor 13 may confirm a plurality of users from a digital image by using a seating table positioning method. For the convenience of explanation, the classroom D and the digital image D1 are taken as an example to explain how the processor 13 performs the seating table positioning method. Specifically, the processor 13 utilizes an initial image of the classroom D (i.e., the image when there is no student in classroom D) and the student seating table of the classroom D. Since six students U1, U2, U3, U4, U5, and U6 will attend the course in classroom D, the student seating table is the relative position of the six students in classroom D as shown in FIG. 2B. The processor 13 subtracts the initial image from the digital image D1, compares the image after the subtraction with the student seating table, and confirms the actual users (students) in the digital image D1 by comparing the relative positions. Therefore, the processor 13 can confirm the correspondence between the facial messages and the users (students) which is identified based on the digital image D1, and the correspondence between the body messages and the users (students) which is identified based on the digital image D1.

In addition to the above operations, the system for monitoring qualities of teaching and learning 1 in the second embodiment can perform all the operations described in the first embodiment. Based on the above description, a person having ordinary skill in the art can directly understand how the system for monitoring qualities of teaching and learning 1 performs all the operations described in the first embodiment in the second embodiment to have the same function and achieve the same technical effects, so the details are not repeated herein.

Figure 3A:
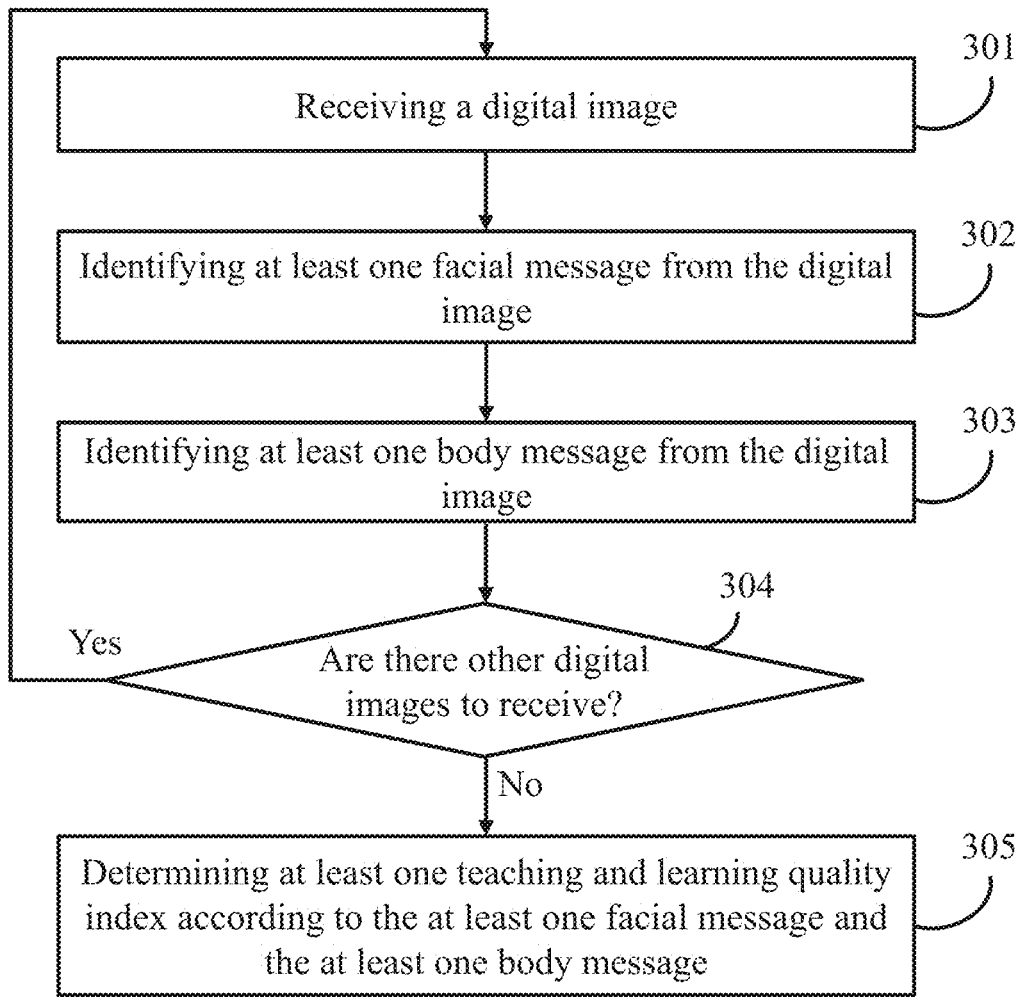
FIG. 3A is a flow chart of the method for monitoring qualities of teaching and learning of the third embodiment of the present invention.

The third embodiment is a method for monitoring qualities of teaching and learning and the flow chart of which is illustrated in FIG. 3A. The method for monitoring qualities of teaching and learning is suitable for an electronic computing apparatus (for example, a computer, a server, or other apparatus with similar electronic computing capabilities). The method for monitoring qualities of teaching and learning comprises the steps 301 to 305, the steps may be operated by the electronic computing apparatus, and the details of each step are described below.

The step 301: receiving at least one digital image.

The step 302: identifying at least one facial message from each of the at least one digital image.

The step 303: identifying at least one body message from each of the at least one digital image.

The step 304: determining whether there are other digital images to receive. If positive, the method repeats the steps 301 to 304. If negative, the method executes the step 305.

The step 305: determining at least one teaching and learning quality index according to the at least one facial message and the at least one body message.

It shall be explained that the present invention does not limit the order for executing the steps 302 and 303. In other words, the step 302 may be performed earlier than the step 303, may be performed later than the step 303, or may be performed simultaneously with the step 303. Moreover, in some embodiments, the method for monitoring qualities of teaching and learning can timely perform the step 305. In other words, the method for monitoring qualities of teaching and learning may perform the step 305 without waiting for the step 304 to determine that there are no other digital images to be received. For example, the method for monitoring qualities of teaching and learning can periodically determine a teaching and learning quality index based on the currently calculated facial messages and body messages (or a part of facial messages and body messages).

In some embodiments, the digital image received in the step 301 comprises images of a plurality of users. In these embodiments, the method for monitoring qualities of teaching and learning further comprises a step of determining a plurality of users from the digital image. The facial messages identified in the step 302 corresponds to one of the users, the body message identified in the step 303 corresponds to one of the users, and the teaching and learning quality index identified in the step 305 corresponds to one of the users.

Figure 3B:
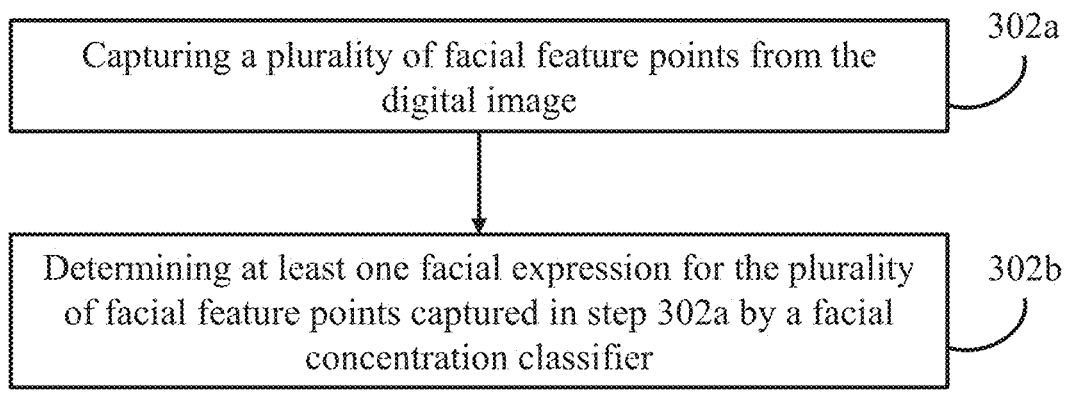
FIG. 3B is a part of the flow chart of the method for monitoring qualities of teaching and learning in some embodiments.

In some embodiments, the method for monitoring qualities of teaching and learning may complete the step 302 by the flowchart shown in FIG. 3B, and the details of each step are described below.

The step 302a: capturing a plurality of facial feature points from the digital image.

The step 302b: determining at least one facial expression for the facial feature points obtained in the step 302a by a facial concentration classifier. The at least one facial message of digital image comprises the at least one facial expression.

In these embodiments, the step 305 comprises a step of determining at least one course satisfaction value according to the at least one facial expression, wherein the at least one teaching and learning quality index comprises the at least one course satisfaction value.

Figure 3C:
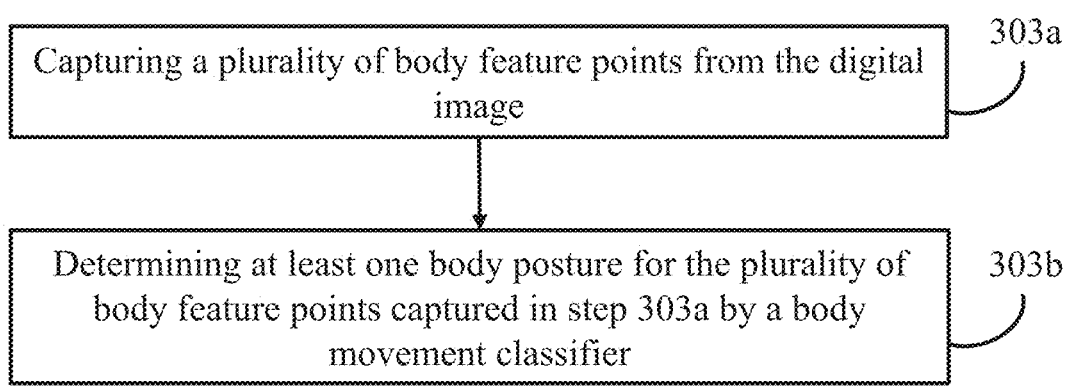
FIG. 3C is a part of the flow chart of the method for monitoring qualities of teaching and learning in some embodiments.

In some embodiments, the method for monitoring qualities of teaching and learning may complete the step 303 by the flowchart shown in FIG. 3C, and the details of each step are described below.

The step 303a: capturing a plurality of body feature points from the digital image.

The step 303b: determining at least one body posture for the body feature points obtained in the step 303a by a body movement classifier. The at least one body message of digital image comprises the at least one body posture.

In these embodiments, the step 305 comprises a step of determining at least one student interaction level according to the at least one body posture, wherein the at least one teaching and learning quality index comprises the at least one student interaction level.

Figure 3D:
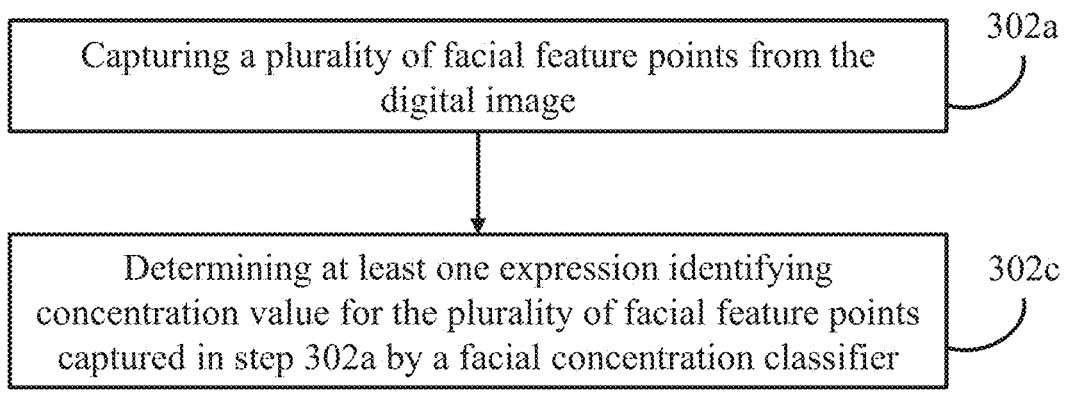
FIG. 3D is a part of the flow chart of the method for monitoring qualities of teaching and learning in some embodiments.
Figure 3E:
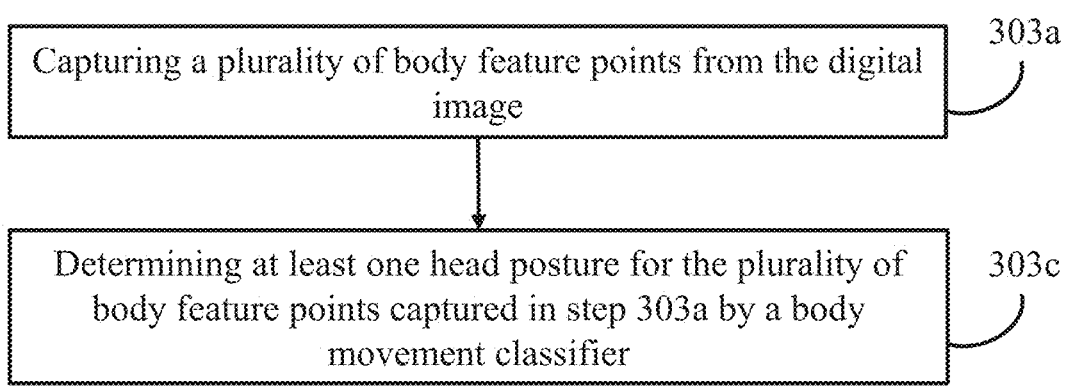
FIG. 3E is a part of the flow chart of the method for monitoring qualities of teaching and learning in some embodiments.

In some embodiments, the method for monitoring qualities of teaching and learning may complete the step 302 by the flowchart shown in FIG. 3D and complete the step 303 by the flowchart shown in FIG. 3E.

Specifically, the flowchart shown in FIG. 3D comprises the steps 302a and 302c, wherein the step 302a has been described in detail. The step 302c is a step of determining at least one expression identifying concentration value for the facial feature points obtained in step 302a by a facial concentration classifier. The flowchart shown in FIG. 3E comprises the steps 303a and 303c, wherein the step 303a has been described in detail. The step 303c is a step of determining at least one head posture for the body feature points obtained in the step 303a by a body movement classifier. In these embodiments, the at least one facial message of the digital image comprises the at least one expression identifying concentration value, while the at least one body message of the digital image comprises the at least one head posture. In these embodiments, the step 305 comprises a step of determining at least one student hard work level value according to the at least one expression identifying concentration value and the at least one head posture, wherein the at least one teaching and learning quality index comprises the at least one student hard work level value.

In some embodiments, the method for monitoring qualities of teaching and learning can complete the step 302 by the aforesaid steps 302a, 302b, and 302c and can complete the step 303 by the steps 303a, 303b, and 303c. In these embodiments, the at least one facial message of the digital image comprises the at least one facial expression and the at least one expression identifying concentration value, while the at least one body message comprises the at least one body posture and the at least one head posture. The step 305 comprises a step of determining at least one course satisfaction value according to the at least one facial expression, another step of determining at least one student interaction level according to the at least one body posture, and another step of determining at least one student hard work level value according to the at least one expression identifying concentration value and the at least one head posture. The at least one teaching and learning quality index comprises the at least one course satisfaction value, the at least one student interaction level, and the at least one student hard work level value.

In some embodiments, each of the at least one digital image corresponds to a time point, each of the at least one facial message corresponds to one of the time points, each of the at least one body message corresponds to one of the time points, and each of the at least one teaching and learning quality index corresponds to one of the time points. Specifically, the at least one facial message and the at least one body message obtained based on a digit image correspond to the time point corresponding to the digital image. In these embodiments, the step 305 may calculate at least one teaching and learning quality index for each time point according to the corresponding at least one facial message and the at least one body message. Therefore, each of the at least one teaching and learning quality index also corresponds to one of the time points. In these embodiments, the method for monitoring qualities of teaching and learning may further comprise a step of calculating a total quality index according to the at least one teaching and learning quality index (for example, adding up the teaching and learning quality indexes of different time points as a total quality index).

Figure 3F:
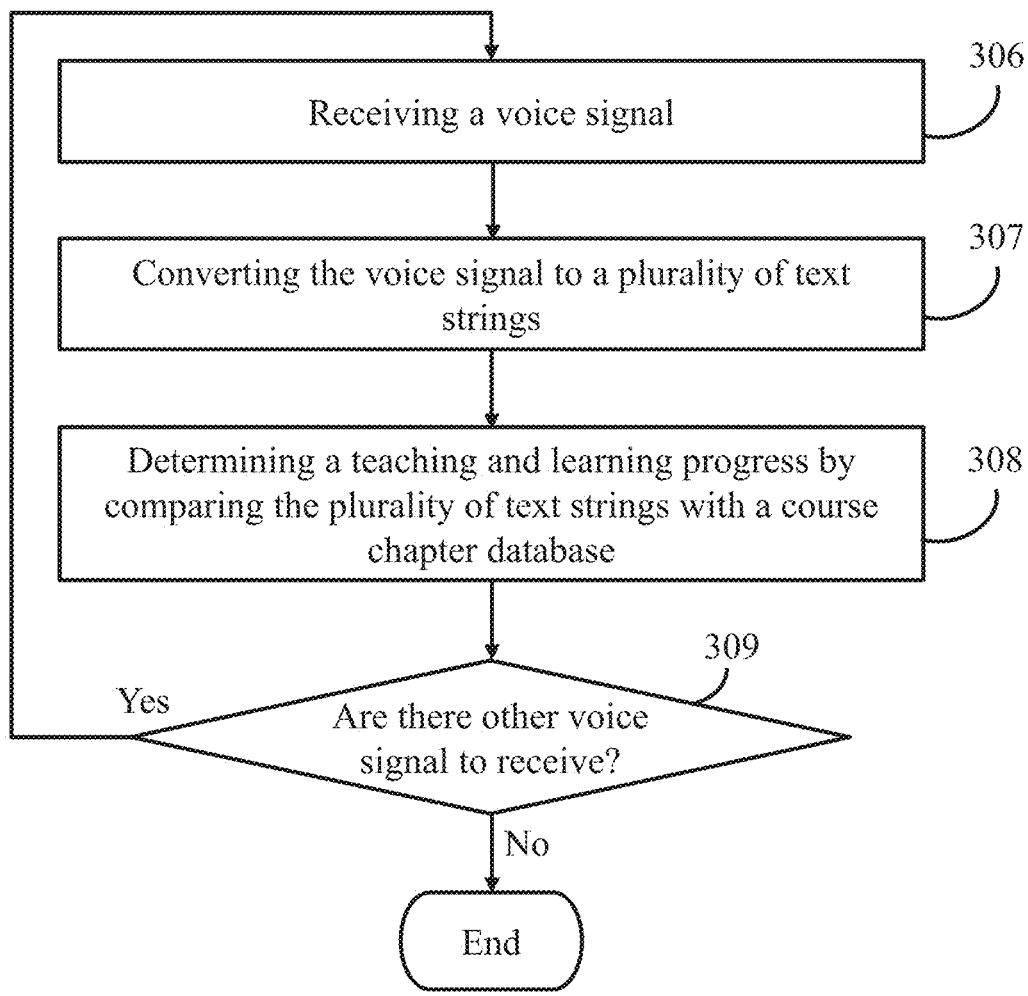
FIG. 3F is a part of the flow chart of the method for monitoring qualities of teaching and learning in some embodiments.

In some embodiments, the method for monitoring qualities of teaching and learning may further operate the flowchart shown in FIG. 3F, which comprises the steps 306 to 309. The details of each step are described below.

The step 306: receiving a voice signal.

The step 307: converting the voice signal to a plurality of text strings.

The step 308: determining at least one teaching and learning progress by comparing the text strings with a course chapter database.

The step 309: determining whether there are other voice signals to receive. If positive, repeating the steps 306 to 309. If negative, end the processing of the voice signals.

In some embodiments, each digital image corresponds to a first time point, each facial message corresponds to one of the first time points, each body message corresponds to one of the first time points, and each teaching and learning quality index corresponds to one of the first time points. Moreover, each voice signal corresponds to a second time points, and each teaching and learning progress corresponds to one of the second time points. In these embodiments, the method for monitoring qualities of teaching and learning further comprises a step of assigning each of the at least one teaching and learning quality index to one of the at least one teaching and learning progress by comparing the first time points with the second time points.

In addition to the above operations, the third embodiment may perform all the operations described in the first and the second embodiment to have the same function and achieve the same technical effects. A person having ordinary skill in the art can directly understand how the third embodiment performs all the operations and steps based on the first embodiment in the second embodiment to have the same function and achieve the same technical effects, so the details are not repeated herein.

In summary, when a teacher provides a course through the network, the technology (including the system and the method) for monitoring qualities of teaching and learning provided by the present invention can identify the students' facial messages and body messages from the digital images of the students timely (even immediately) to determine the teaching and learning quality index and provide these information to the teacher for reference. Therefore, the teacher may timely (or even immediately) grasp the learning status of each of the students and timely adjust the content of courses and/or the way of teaching courses and then significantly improve the quality of online teaching and learning. In addition, the system for monitoring qualities of teaching and learning 1 may also determine the teaching and learning progress according to the voice signal of the teaching course which is being provided by the teacher, and then establishes the correspondence between the teaching and learning quality index and the teaching and learning progress to let the teacher grasp the learning status of the students for different teaching and learning progress, and let the teacher further refer to the aforesaid information and assess whether the teaching content should be improved.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A system for monitoring qualities of teaching and learning, comprising:
    at least one receiving interface, being configured to receive at least one digital image;
    a processor electrically connected to the at least one receiving interface, being configured to identify at least one facial message from each of the at least one digital image, identify at least one body message from each of the at least one digital image, and determine at least one teaching and learning quality index according to the at least one facial message and the at least one body message; and
    an output apparatus electrically connected to the processor, being configured to output the at least one facial message, the at least one body message, and the at least one teaching and learning quality index;
    wherein the at least one receiving interface is further configured to receive at least one voice signal; and
    wherein the processor is further configured to convert the at least one voice signal to a plurality of text strings, and determine at least one teaching and learning progress by comparing the plurality of text strings with a course chapter database.

2. The system for monitoring qualities of teaching and learning of claim 1, wherein the processor identifies the at least one facial message from each of the at least one digital image by performing the following operations:
    capturing a plurality of facial feature points from each of the at least one digital image; and
    determining at least one facial expression for the plurality of facial feature points corresponding to each of the at least one digital image by a facial concentration classifier;
    wherein the at least one facial message comprises the at least one facial expression, the processor is further configured to determine at least one course satisfaction value according to the at least one facial expression, and the at least one teaching and learning quality index comprises the at least one course satisfaction value.

3. The system for monitoring qualities of teaching and learning of claim 1, wherein the processor identifies the at least one body message from each of the at least one digital image by performing the following operations:
    capturing a plurality of body feature points from each of the at least one digital image; and
    determining at least one body posture for the plurality of body feature points corresponding to each of the at least one digital image by a body movement classifier;
    wherein the at least one body message comprises the at least one body posture, the processor is further configured to determine at least one student interaction level according to the at least one body posture, and the at least one teaching and learning quality index comprises the at least one student interaction level.

4. The system for monitoring qualities of teaching and learning of claim 1, wherein the processor identifies the at least one facial message from each of the at least one digital image by performing the following operations:
capturing a plurality of facial feature points from each of the at least one digital image; and
determining at least one expression identifying concentration value for the plurality of facial feature points corresponding to each of the at least one digital image by a facial concentration classifier;
wherein the processor identifies the at least one body message from each of the at least one digital image by performing following operations:
capturing a plurality of body feature points from each of the at least one digital image; and
determining at least one head posture for the plurality of body feature points corresponding to each of the at least one digital image by a body movement classifier;
wherein the at least one facial message comprises the at least one expression identifying concentration value, the at least one body message comprises the at least one head posture, the processor is further configured to determine at least one student hard work level value according to the at least one expression identifying concentration value and the at least one head posture, and the at least one teaching and learning quality index comprises the at least one student hard work level value.

5. The system for monitoring qualities of teaching and learning of claim 1, wherein each of the at least one digital image corresponds to a time point, each of the at least one facial message corresponds to one of the time points, each of the at least one body message corresponds to one of the time points, and each of the at least one teaching and learning quality index corresponds to one of the time points.

6. The system for monitoring qualities of teaching and learning of claim 5, wherein the processor is further configured to calculate a total quality index according to the at least one teaching and learning quality index.

7. The system for monitoring qualities of teaching and learning of claim 1, wherein each of the at least one voice signal corresponds to a time point, and each of the at least one teaching and learning quality index corresponds to one of the time points.

8. The system for monitoring qualities of teaching and learning of claim 1, wherein each of the at least one digital image corresponds to a first time point, each of the at least one facial message corresponds to one of the first time points, each of the at least one body message corresponds to one of the first time points, each of the at least one teaching and learning quality index corresponds to one of the first time points, each of the at least one voice signal corresponds to a second time point, and each of the at least one teaching and learning progress corresponds to one of the second time points, wherein the processor is further configured to assign each of the at least one teaching and learning quality index to one of the at least one teaching and learning progress by comparing the first time points with the second time points.

9. The system for monitoring qualities of teaching and learning of claim 1, wherein the processor is further configured to determine a plurality of users from each of the at least one digital image, each of the at least one facial message corresponds to one of the plurality of users, each of the at least one body message corresponds to one of the plurality of users, and each of the at least one teaching and learning quality index corresponds to one of the plurality of users.

10. A method for monitoring qualities of teaching and learning, the method being adapted for an electronic computing apparatus, the method comprising:
(a) receiving at least one digital image;
(b) identifying at least one facial message from each of the at least one digital image;
(c) identifying at least one body message from each of the at least one digital image;
(d) determining at least one teaching and learning quality index according to the at least one facial message and the at least one body message;
(e) receiving at least one voice signal;
(f) converting the at least one voice signal to a plurality of text strings; and
(g) determining at least one teaching and learning progress by comparing the plurality of text strings with a course chapter database.

11. The method for monitoring qualities of teaching and learning of claim 10, wherein the step (b) comprises:
capturing a plurality of facial feature points from each of the at least one digital image; and
determining at least one facial expression for the plurality of facial feature points corresponding to each of the at least one digital image by a facial concentration classifier;
wherein the at least one facial message comprises the at least one facial expression, and the method further comprises the following step:
determining at least one course satisfaction value according to the at least one facial expression, wherein the at least one teaching and learning quality index comprises the at least one course satisfaction value.

12. The method for monitoring qualities of teaching and learning of claim 10, wherein the step (c) comprises:
capturing a plurality of body feature points from each of the at least one digital image; and
determining at least one body posture for the plurality of body feature points corresponding to each of the at least one digital image by a body movement classifier;
wherein the at least one body message comprises the at least one body posture, and the method further comprises the following step:
determining at least one student interaction level according to the at least one body posture, and the at least one teaching and learning quality index comprises the at least one student interaction level.

13. The method for monitoring qualities of teaching and learning of claim 10, wherein the step (b) comprises:
capturing a plurality of facial feature points from each of the at least one digital image; and
determining at least one expression identifying concentration value for the plurality of facial feature points corresponding to each of the at least one digital image by a facial concentration classifier;
wherein the step (c) comprises the following steps:
capturing a plurality of body feature points from each of the at least one digital image; and
determining at least one head posture for the plurality of body feature points corresponding to each of the at least one digital image by a body movement classifier; and
wherein the at least one facial message comprises the at least one expression identifying concentration value, the at least one body message comprises the at least one head posture, and the method further comprises the following step:
    determining at least one student hard work level value according to the at least one expression identifying concentration value and the at least one head posture, wherein the at least one teaching and learning quality index comprises the at least one student hard work level value.

14. The method for monitoring qualities of teaching and learning of claim 10, wherein each of the at least one digital image corresponds to a time point, each of the at least one facial message corresponds to one of the time points, each of the at least one body message corresponds to one of the time points, and each of the at least one teaching and learning quality index corresponds to one of the time points.

15. The method for monitoring qualities of teaching and learning of claim 14, further comprising:
    calculating a total quality index according to the at least one teaching and learning quality index.

16. The method for monitoring qualities of teaching and learning of claim 10, wherein each of the at least one voice signal corresponds to a time point, and each of the at least one teaching and learning quality index corresponds to one of the time points.

17. The method for monitoring qualities of teaching and learning of claim 10, wherein each of the at least one digital image corresponds to a first time point, each of the at least one facial message corresponds to one of the first time points, each of the at least one body message corresponds to one of the first time points, each of the at least one teaching and learning quality index corresponds to one of the first time points, each of the at least one voice signal corresponds to a second time points, and each of the at least one teaching and learning progress corresponds to one of the second time points, the method further comprising:
    assigning each of the at least one teaching and learning quality index to one of the at least one teaching and learning progress by comparing the first time points with the second time points.

18. The method for monitoring qualities of teaching and learning of claim 10, further comprising:
    determining a plurality of users from each of the at least one digital image;
    wherein each of the at least one facial message corresponds to one of the plurality of users, each of the at least one body message corresponds to one of the plurality of users, and each of the at least one teaching and learning quality index corresponds to one of the plurality of users.

* * * * *